United States Patent
Palan et al.

(10) Patent No.: US 12,531,837 B2
(45) Date of Patent: Jan. 20, 2026

(54) VALIDATION ENGINE FOR FIREWALL MIGRATION

(71) Applicant: Fortinet, Inc., Sunnyvale, CA (US)

(72) Inventors: Anish Palan, Mumbai (IN); Anurag Verma, Karnataka (IN); Vinayak Manjunath, Karnataka (IN)

(73) Assignee: Fortinet, Inc., Sunnyvale, CA (US)

( * ) Notice: Subject to any disclaimer, the term of this patent is extended or adjusted under 35 U.S.C. 154(b) by 97 days.

(21) Appl. No.: 18/401,612

(22) Filed: Dec. 31, 2023

(65) Prior Publication Data

US 2025/0219999 A1   Jul. 3, 2025

(51) Int. Cl.
*H04L 9/40* (2022.01)
*H04L 41/14* (2022.01)
*H04L 43/026* (2022.01)

(52) U.S. Cl.
CPC .......... *H04L 63/029* (2013.01); *H04L 41/145* (2013.01); *H04L 43/026* (2013.01); *H04L 63/02* (2013.01); *H04L 63/0218* (2013.01); *H04L 63/0263* (2013.01); *H04L 63/1425* (2013.01); *H04L 63/20* (2013.01)

(58) Field of Classification Search
CPC ..... H04L 41/145; H04L 43/026; H04L 63/20; H04L 63/02; H04L 63/1425; H04L 63/0263; H04L 63/0218; H04L 63/029
See application file for complete search history.

(56) References Cited

U.S. PATENT DOCUMENTS

| | | | |
|---|---|---|---|
| 11,570,148 B2 * | 1/2023 | Liu | H04L 67/10 |
| 2017/0012940 A1 * | 1/2017 | Chang | H04L 63/0263 |
| 2019/0394170 A1 * | 12/2019 | Shameli-Sendi | H04L 63/0263 |
| 2020/0329011 A1 * | 10/2020 | Cai | H04L 63/0263 |

OTHER PUBLICATIONS

"Two Firewalls on the Same Subnet"—Spiceworks, Verizon Business, Sep. 2019 https://community.spiceworks.com/t/two-firewall-on-the-same-subnet-firewall-migration/731713 (Year: 2019).*

"Your Comprehensive Firewall Migration Checklist"—Avidgor Book, Tufin, Sep. 4, 2023 https://www.tufin.com/blog/comprehensive-firewall-migration-checklist (Year: 2023).*

* cited by examiner

*Primary Examiner* — Randy A Scott
(74) *Attorney, Agent, or Firm* — Law Office of Dorian Cartwright; Dorian Cartwright

(57) ABSTRACT

Log data is gathered from the first firewall. The log data includes first firewall activity and actions responsive to past traffic. Production traffic can then be simulated by running the gathered log data of first firewall activity through the second firewall. The simulation results are analyzed to rate configuration settings including whether policy lookups are successful and retrieving a policy ID for successful policy lookups. Invalid lookups are identified. The configuration settings of the second firewall are automatically adjusted (e.g., with a ne rule) with respect to the invalid lookups. The second firewall configuration settings are validated based on the automatic adjustments.

5 Claims, 6 Drawing Sheets

VALIDATION ENGINE FOR FIREWALL MIGRATION

FIELD OF THE INVENTION

The invention relates generally to computer networks, and more specifically, for validating configuration data transferred during migration from a first firewall currently in service to a second firewall launching into service.

BACKGROUND

Data and configuration migrations occur in computing systems when new computing systems replace outdated ones. The computing device, operating system, or application changeover can undesirably result in default settings. Migration allows the new computing system to maintain some aspects of the outdated one.

The verification and validation process of configurations is manual, in many instances. This process is tedious and time consuming, especially for the larger scale migration. Additionally, despite best efforts, the ability to deliver an error free configuration transfer has not scalable.

What is needed is a robust technique for validating configuration data transferred during migration from a first firewall currently in service to a second firewall launching into service.

SUMMARY

To meet the above-described needs, methods, computer program products, and systems for validating configuration data transferred during migration from a first firewall currently in service to a second firewall launching into service.

In one embodiment, log data is gathered from the first firewall. The log data includes first firewall activity and actions responsive to past traffic. Production traffic can then be simulated by running the gathered log data of first firewall activity through the second firewall. The simulation results are analyzed to rate configuration settings including whether policy lookups are successful and retrieving a policy ID for successful policy lookups.

In another embodiment, invalid lookups are identified. The configuration settings of the second firewall are automatically adjusted (e.g., with a new rule) with respect to the invalid lookups. The second firewall configuration settings are validated based on the automatic adjustments.

Advantageously, network performance is improved with updated firewalls that are quickly migrated into service.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for validating configuration data transferred during migration from a first firewall currently in service to a second firewall launching into service. The following disclosure is limited only for the purpose of conciseness, as one of ordinary skill in the art will recognize additional embodiments given the ones described herein.

I. Systems for Validating Configuration Data (FIGS. 1-3)

Figure 1:
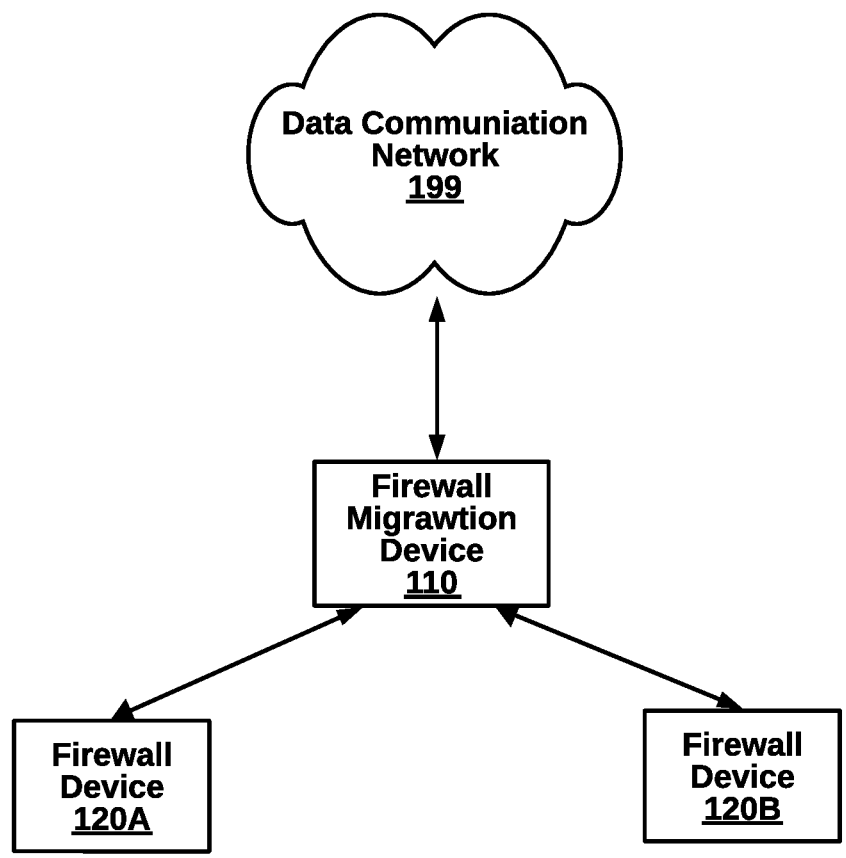
FIG. 1 is a high-level block diagram illustrating aspects of a local system for validating configuration information during migration, according to some embodiments.
Figure 6:
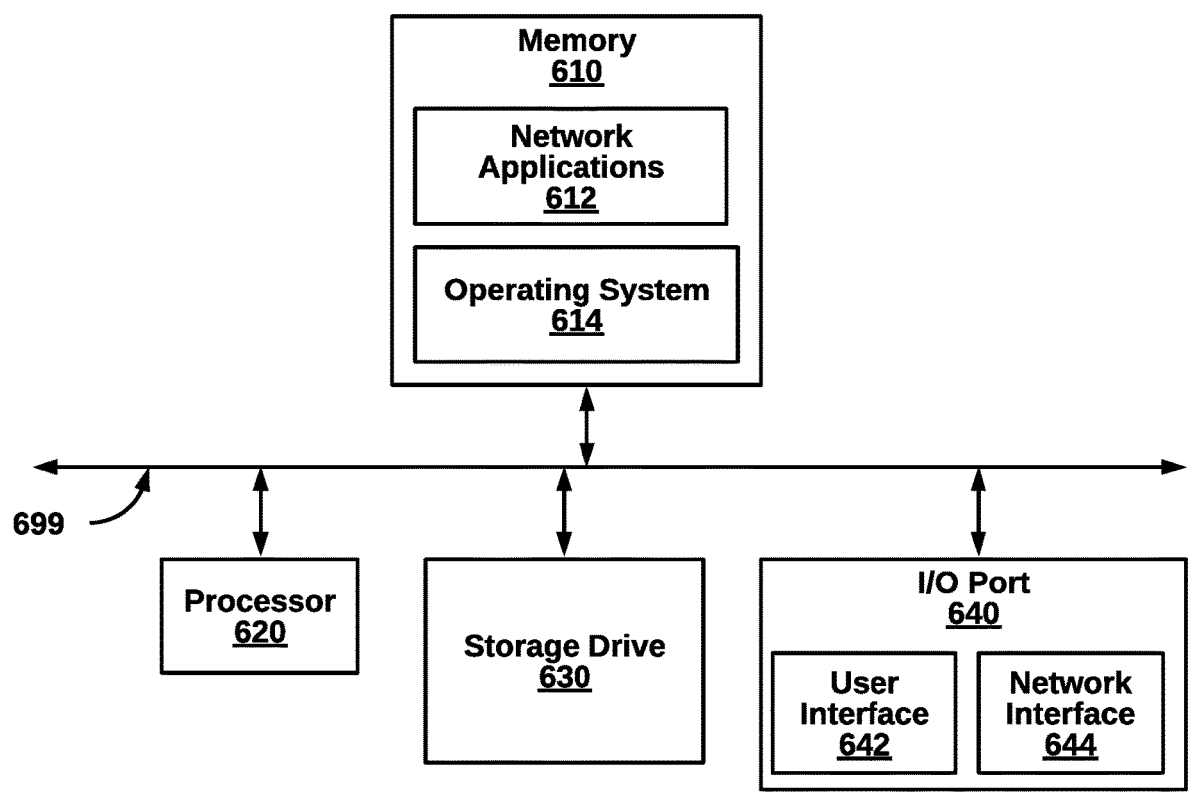
FIG. 6 is a block diagram illustrating an example computing device for the system of FIG. 1, according to one embodiment.

FIG. 1 is a high-level block diagrams illustrating a local system 100A for validating configuration information during (or after) migration, according to an embodiment. The system 100A includes a firewall migration (and validation) device 110, first firewall device 120A, second firewall device 120B. Other embodiments of the system 100A can include additional components that are not shown in FIG. 1, such as routers, switches, network gateways, access points and stations are also possible. For example, the system 100A of FIG. 1 shows one firewall migration device and two firewall devices, however, other examples several distributed firewall migration devices and twenty or hundreds of migration processes across tens or hundreds of firewall devices. The components of system 100A can be implemented in hardware, software, or a combination of both. An example implementation is shown in FIG. 6.

Figure 2:
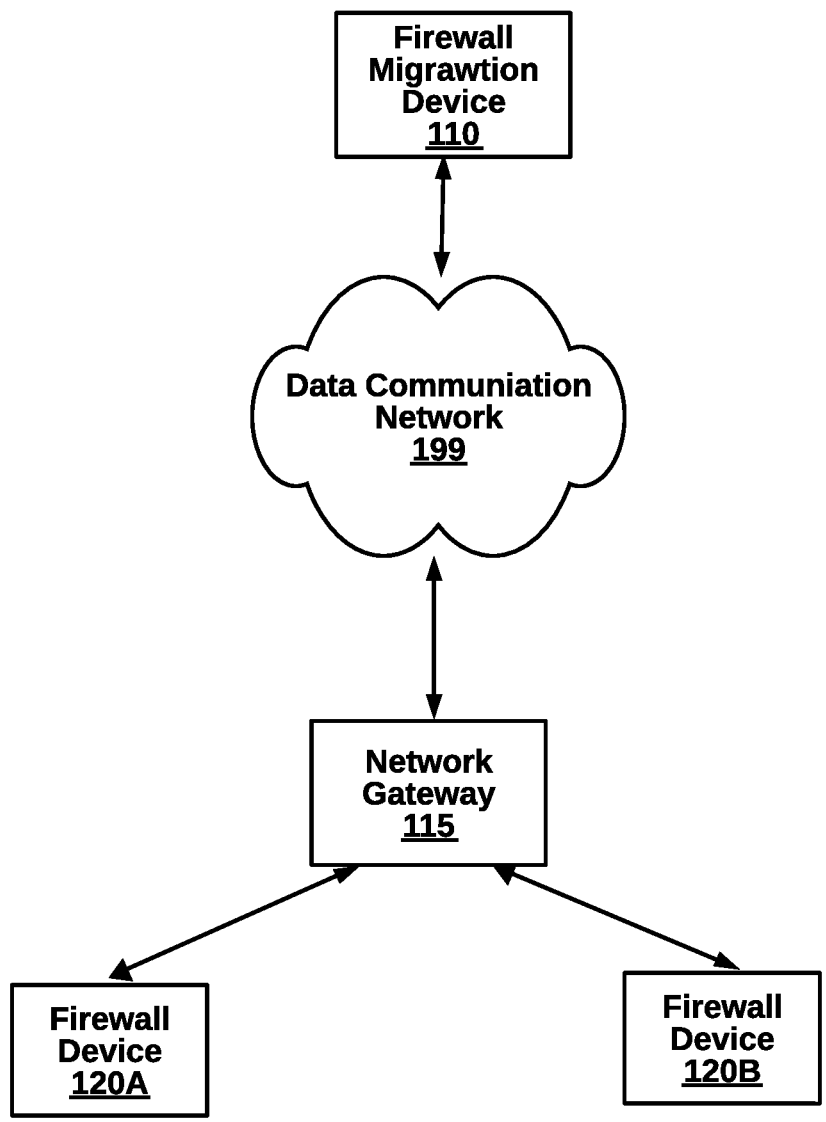
FIG. 2 is a high-level block diagram illustrating aspects of a distributed system for validating configuration information during migration, according to some embodiments.
Figure 3:
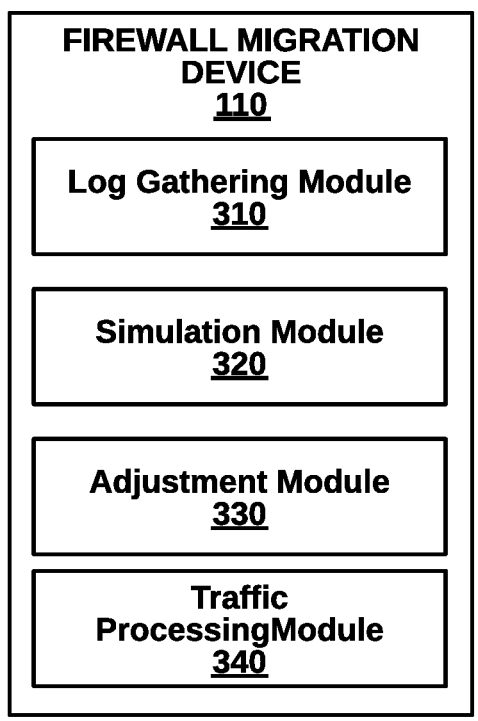
FIG. 3 is a more detailed block diagram illustrating a firewall migration device of the system of FIG. 1, according to one embodiment.

In one embodiment, the components of the system 100B are distributed and are coupled in communication over a private network connected to a public network, such as the Internet, as shown in FIG. 2. In another embodiment, system 100A is an isolated, private network, or alternatively, a set of geographically dispersed LANs. The components can be connected to the data communication system via hard wire (e.g., firewall migration device 110, and first and second firewall devices 120A, B). The components can also be connected via wireless networking. The data communication network can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPv6 address spaces. In other embodiments, such as in FIG. 1, the system 100A can be directly connected or on a single device, in other implementations.

The firewall migration device 110 can facilitate migration of a firewall, including validation of configuration settings, as described herein. The migration can also include a separate migration and configuration of firewall policies used at the first firewall. If an entire device image is being transferred or migrated, then an operating system and other applications may also be part of migration. In some embodiments, the firewall migration device is local behind a network gateway 115 as in FIG. 1, and in other embodiments, is on the cloud as in FIG. 2.

FIG. 3 is a more detailed block diagram illustrating the firewall migration device 110 of the system of FIGS. 2, 3, according to one embodiment. The firewall migration device 110 includes a log gathering module 310, a simulation module 320, an adjustment module 330 and a traffic processing module 340. The components can be implemented in hardware, software, or a combination of both.

The log gathering module 310 configured for gathering log data from the first firewall. The log data includes first firewall activity and actions responsive to past traffic.

The simulation module 320 can simulate production traffic by running the gathered log data of first firewall activity through the second firewall. The simulation module 220 can also analyze the simulation results to rate configuration settings including whether policy lookups are successful and retrieving a policy ID for successful policy lookups.

In another embodiment, each line of parsed log data can be validated by conducting a policy lookup on the converted configuration. If the line or a tuple from the parsed log data is matching against any converted policy lookup on the converted policy, the original firewall policy is highlighted.

The adjustment module 330 checks a cache of invalid lookups that have been identified. Automatic adjustments are made for configuration settings of the second firewall with respect to the invalid lookups. In some cases, a cloud-based server is checked for settings. Afterwards, the second firewall configuration settings can optionally be validated based on the automatic adjustments.

The traffic processing module 340 runs live traffic through the second firewall as validated. In more detail, data packets are scrutinized according to policies. The policies can be set by users, network administrators, or by processes such as applications being executed. The data packets can be parsed, hashed, subject to deep packet inspection, and other analysis.

II. Methods for Validating Configuration Data (FIGS. 4-5)

Figure 4:
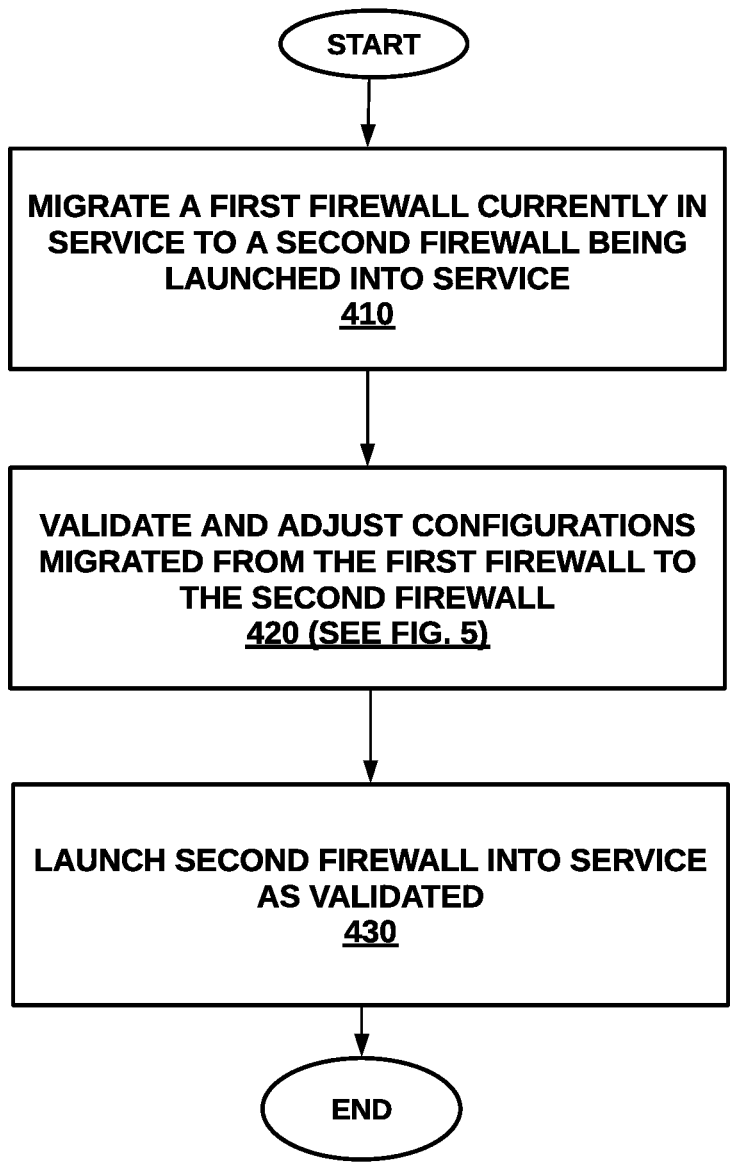
FIG. 4 is a high-level flow diagram illustrating a method for validating configuration information during migration, according to an embodiment.

FIG. 4 is a high-level flow diagram of a method 400 for validating configuration information during migration, according to an embodiment. The method 400 can be implemented by, for example, system 100A of FIG. 1. The specific grouping of functionalities and order of steps are a mere example as many other variations of method 400 are possible, within the spirit of the present disclosure.

Specifically, at step 410, a first firewall currently in service is migrated to a second firewall being launched into service, as a replacement to the first firewall. In another case, the second firewall is a mirror, an archive, or a backup. At step 420, configuration data transferred during migration from a first firewall currently in service to a second firewall launching into service is validated, as described in more detail in association with FIG. 5. At step 430, the second firewall is launched into service as validated.

Figure 5:
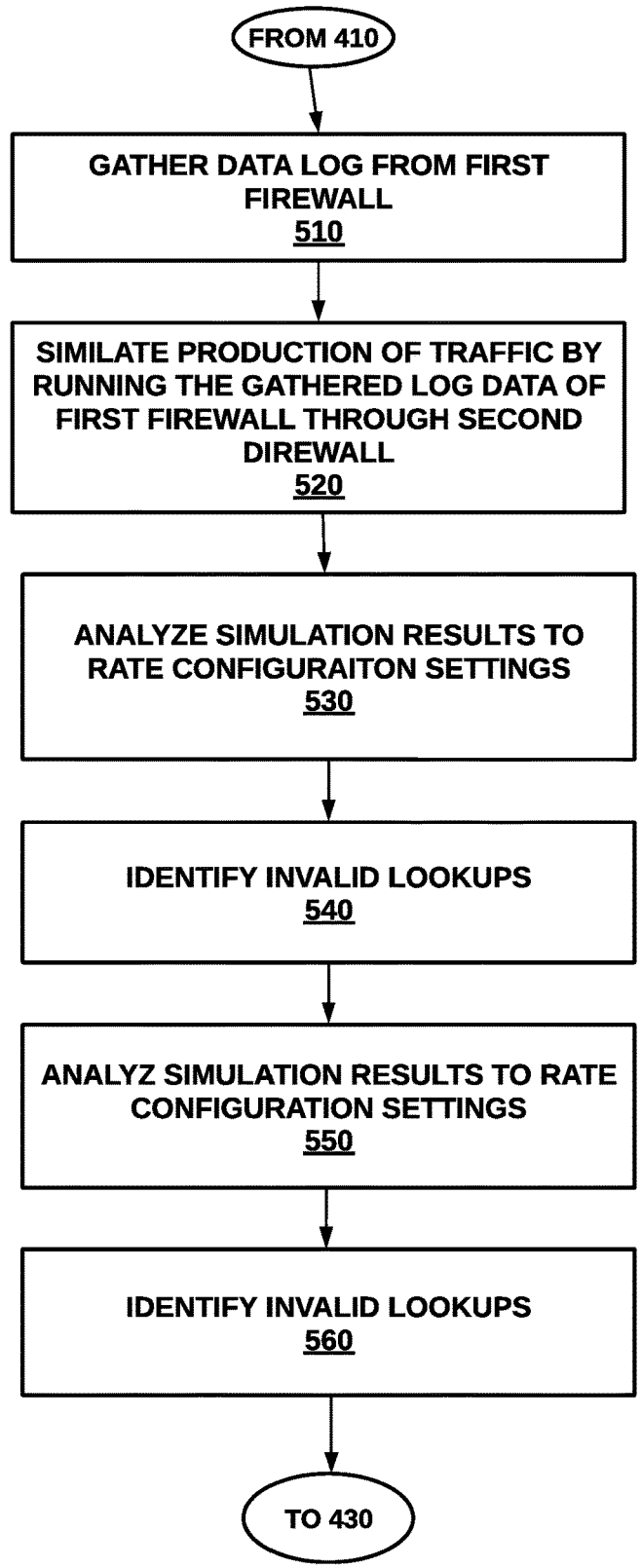
FIG. 5 is a more detailed flow diagram illustrating a step for validating configuration data transferred during migration from a first firewall currently in service to a second firewall launching into service, from the method of FIG. 4, according to one embodiment.

FIG. 5 is a more detailed flow diagram detailing the step 420 of validating configuration data transferred during migration from a first firewall currently in service to a second firewall launching into service. Other variations are possible for different implementations.

At step 510, log data is gathered from the first firewall. The log data can be past transactions of the last day, week, month, year, or the like. The log data includes first firewall activity and actions responsive to past traffic.

At step 520, simulation of production traffic occurs by running the gathered log data of first firewall activity through the second firewall.

At step 530, the simulation results are analyzed to rate configuration settings including whether policy lookups are successful and retrieving a policy ID for successful policy lookups.

At step 540, invalid lookups are identified.

At step 550, configuration settings of the second firewall can be automatically adjusted with respect to the invalid lookups.

At step 560, the second firewall configuration settings is validated based on the automatic adjustments.

III. Computing Device for Validating Configuration Data (FIG. 6)

FIG. 6 is a block diagram illustrating a computing device 600 for use in the system 100A, B of FIGS. 1 and 2, according to one embodiment. The computing device 600 is a non-limiting example device for implementing each of the components of the system 100, including the firewall migration device 110, and the first and send firewall devices 120A, B. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory (RAM, ROM, mobile, or affixed) 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICS)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a firewall migration device for validating configuration data transferred during migration from a first firewall currently in service to a second firewall launching into service, the method comprising:
   gathering log data from the first firewall, wherein the log data includes first firewall activity and actions responsive to past traffic;
   producing a simulation of traffic by running the gathered log data of first firewall activity through the second firewall, wherein the second firewall is distinct from the first firewall;
   analyzing the simulation results to rate configuration settings including whether policy lookups are successful and retrieving a policy ID for successful policy lookups;
   identifying unsuccessful policy lookups from the simulation;
   automatically adjusting configuration settings of the second firewall with respect to the unsuccessful policy lookups;
   validating the second firewall configuration settings based on the automatic adjustments; and
   running live traffic through the second firewall as validated.

2. The method of claim 1, wherein the step of running live traffic runs live traffic through the second firewall as validated using first firewall policies.

3. The method of claim 1, wherein the step of running live traffic runs live traffic through the second firewall as validated using separately converted first firewall policies.

4. A non-transitory computer-readable medium in a firewall migration device on a data communication network, for validating configuration data transferred during migration from a first firewall currently in service to a second firewall launching into service, the method comprising:
   gathering log data from the first firewall, wherein the log data includes first firewall activity and actions responsive to past traffic;

producing a simulation of traffic by running the gathered log data of first firewall activity through the second firewall, wherein the second firewall is distinct from the first firewall;

analyzing the simulation results to rate configuration settings including whether policy lookups are successful and retrieving a policy ID for successful policy lookups;

identifying unsuccessful policy lookups from the simulation;

automatically adjusting configuration settings of the second firewall with respect to the unsuccessful policy lookups;

validating the second firewall configuration settings based on the automatic adjustments; and running live traffic through the second firewall as validated.

5. A firewall migration device on a data communication network, for validating configuration data transferred during migration from a first firewall currently in service to a second firewall launching into service, the firewall migration device comprising:

a processor;

a network interface communicatively coupled to the processor and to a data communication network; and a memory, communicatively coupled to the processor and storing code, that when executed by the processor, performs the steps of:

gathering log data from the first firewall, wherein the log data includes first firewall activity and actions responsive to past traffic;

producing a simulation of traffic by running the gathered log data of first firewall activity through the second firewall, wherein the second firewall is distinct from the first firewall;

analyzing the simulation results to rate configuration settings including whether policy lookups are successful and retrieving a policy ID for successful policy lookups;

identifying unsuccessful policy lookups from the simulation;

automatically adjusting configuration settings of the second firewall with respect to the unsuccessful policy lookups;

validating the second firewall configuration settings based on the automatic adjustments; and running live traffic through the second firewall as validated.

\* \* \* \* \*